United States Patent
Krzyminski

(10) Patent No.: US 10,062,355 B2
(45) Date of Patent: Aug. 28, 2018

(54) SYSTEM AND METHOD FOR COLOR OPTIMIZATION

(71) Applicant: TECHKON GMBH, Koenigstein im Taunus (DE)

(72) Inventor: Ulrich Krzyminski, Kronberg im Taunus (DE)

(73) Assignee: TECHKON GMBH, Koenigstein im Taunus (DE)

( * ) Notice: Subject to any disclaimer, the term of this patent is extended or adjusted under 35 U.S.C. 154(b) by 0 days.

(21) Appl. No.: 15/482,329

(22) Filed: Apr. 7, 2017

(65) Prior Publication Data

US 2017/0213521 A1    Jul. 27, 2017

Related U.S. Application Data

(63) Continuation of application No. PCT/IB2015/057747, filed on Oct. 9, 2015.

(30) Foreign Application Priority Data

Oct. 9, 2014    (DE) .................. 10 2014 114 707
Oct. 21, 2014   (DE) .................. 10 2014 115 351

(51) Int. Cl.
G09G 5/02      (2006.01)
H04N 1/60      (2006.01)
G01J 3/52      (2006.01)

(52) U.S. Cl.
CPC .................. *G09G 5/02* (2013.01); *G01J 3/52* (2013.01); *H04N 1/603* (2013.01);
(Continued)

(58) Field of Classification Search
CPC ............. G09G 5/02; G09G 2320/0666; G09G 2320/0693; H04N 1/603
See application file for complete search history.

(56) References Cited

U.S. PATENT DOCUMENTS 5,483,259 A *  1/1996  Sachs ................. H04N 17/02
                                              345/594
5,726,672 A    3/1998  Hernandez et al.
(Continued)

FOREIGN PATENT DOCUMENTS

JP    2010-268294 A    11/2010
WO       95/31067 A1   11/1995

OTHER PUBLICATIONS

International Search Report issued in PCT/IB2015/057747; dated Jan. 27, 2016.

*Primary Examiner* — Antonio A Caschera
(74) *Attorney, Agent, or Firm* — Studebaker & Brackett PC

(57) ABSTRACT

A system and a method for color optimization with a distal server displaying a virtual color image in the form of an image file having individual color values on its website, and with a proximal computer connected to the server and having a display unit, the computer displaying on its display unit the virtual color image of the server by way of an application program, products on the display unit in the most optimum colors possible. The system and method include a reference card having several differently colored translucent reference areas besides a transparent or translucent area or an opening and an application program that starts a routine on the server and/or on the computer.

14 Claims, 1 Drawing Sheet

(52) U.S. Cl.
CPC ............ *G09G 2320/0666* (2013.01); *G09G 2320/0693* (2013.01); *H04N 2201/0089* (2013.01)

(56) References Cited

U.S. PATENT DOCUMENTS

| | | |
|---|---|---|
| 6,439,722 B1 | 8/2002 | Seegers et al. |
| 7,102,648 B1 | 9/2006 | Holub |
| 2010/0020117 A1 | 1/2010 | Tanizoe et al. |
| 2014/0168253 A1 | 6/2014 | Arai et al. |
| 2014/0232923 A1 | 8/2014 | Koh et al. |

* cited by examiner

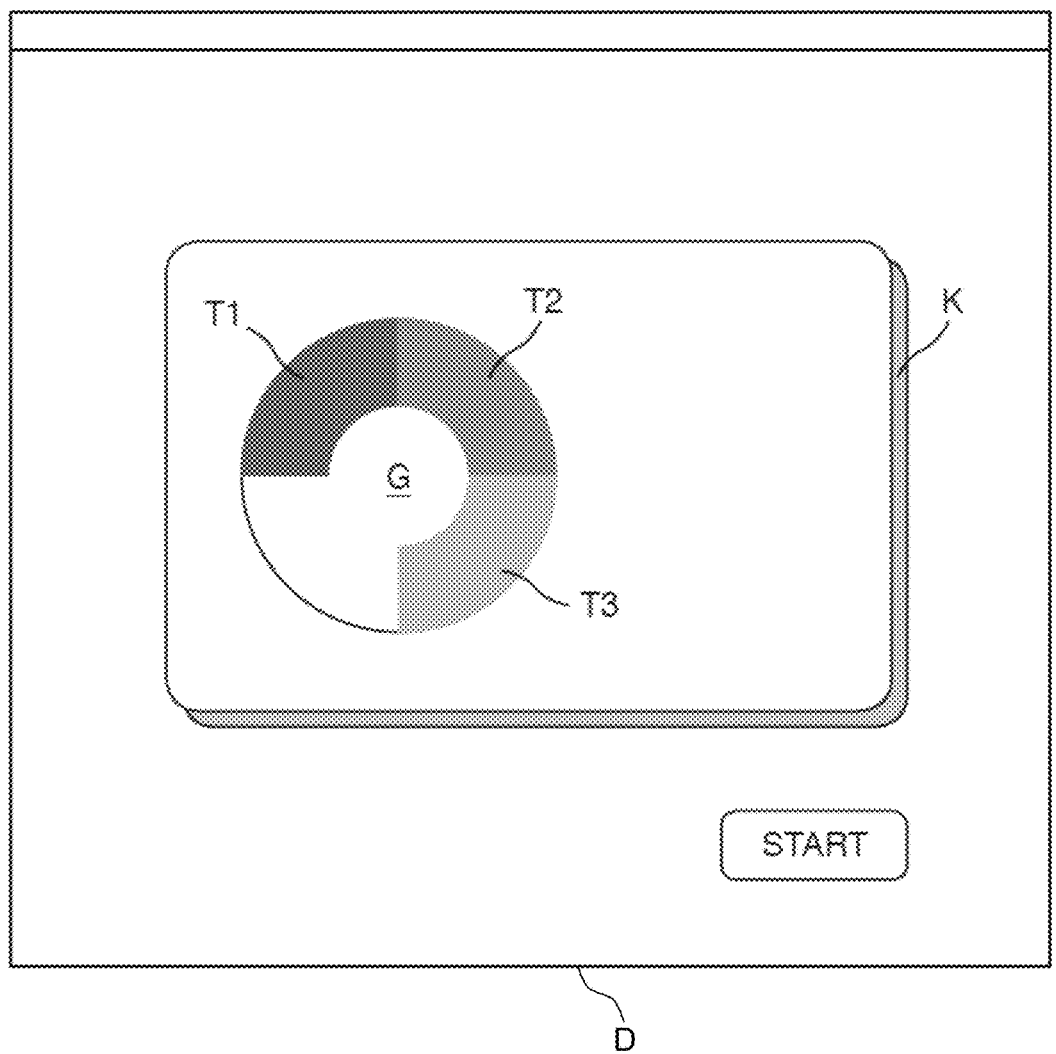

SYSTEM AND METHOD FOR COLOR OPTIMIZATION

CROSS-REFERENCE TO RELATED APPLICATIONS

This application is a continuation of international (WO) patent application no. PCT/IB2015/057747, filed 9 Oct. 2015, which claims
the priority of German (DE) patent application no. 10 2014 114 707.3, filed 9 Oct. 2014, and
the priority of German (DE) patent application no. 10 2014 115 351.0, filed 21 Oct. 2014, the contents of each of which being hereby incorporated herein by reference.

FIELD OF THE INVENTION

The present invention relates to the technical field of color optimization, in particular to displaying image files optimized in terms of colors on any internet site of any display device.

More particularly, the present invention relates to a system for color optimization.

The present invention further relates to a method for color optimization.

BACKGROUND OF THE INVENTION

So far the retail sale offered the real product to be purchased by the customer.

In the field of online sale via the internet, a virtual image of the product is available to the customer on the screen. When the product is delivered, there is often a discrepancy in the coloring; correspondingly high are the returns rates in the field of online sale. For example, clothes returns after often reasoned by "does not fit", followed by "color of product not as expected".

The reason for a different color display of the products on different screens are the technical variety of the screens as well as the different settings chosen by the user and by the programs, for example in respect of brightness, contrast and/or coloring.

So far, it has been technically complex to calibrate screens or to bindingly display colors in industrial applications. In this context, color measuring apparatus determining the screen colors and software correcting the colors by means of the measured values are used.

Due to the high price and the remarkable technical complexity, such solutions are inappropriate for the above-described consumer area. Apart from that, the systems are adapted merely for high-class screens. Displays of mobile end devices, such as of smartphones or of tablets, cannot be calibrated in this way.

U.S. Pat. No. 6,439,722 B1 discloses a method for calibrating a screen by means of colored foils (saturated red, green and blue). The foils are arranged on the white background of the screen and visually compared with similar overlaid color fields. However, the human eye does not clearly recognize color differences of saturated colors for which reason this method is not very exact.

OBJECTS AND SUMMARY OF THE INVENTION

Starting from the above-explained disadvantages and shortcomings as well as taking the outlined prior art into account, the object of the present invention is to further develop a system of the above-mentioned type as well as a method of the above-mentioned type in such a way that products are presented on different display units, in particular on different screens or monitors or displays, in the most optimum colors possible.

This object is achieved by a system device according to the invention with the herein described features and by a method according to the invention with the herein described features, in particular by a reference card and by a color correction program. Advantageous embodiments and expedient further developments of the present invention are described above and below.

This object is achieved by a system
with a distal server displaying a virtual color image in the form of an image file comprising individual color values on its website, and
with a proximal computer connected to the server and comprising a display unit, said computer displaying on its display unit the virtual color image of the server by means of an application program,
[a] wherein a reference card is held in front of the computer, said reference card comprising several differently colored translucent reference areas besides a transparent or translucent area or an opening,
[b.1] wherein the application program then starts a routine on the server and/or on the computer, said routine firstly outputting a first shade, for example cyan, with a first of the color values, said first shade being complementary to the color, for example red, of one of the translucent reference areas of the reference card,
[b.2] wherein the reference card having that translucent reference area whose color is complementary to the first shade displayed on the display unit is then held in front of said first shade, and an identifier is determined and stored for that of the translucent reference areas for which the shade of grey resulting from color mixture of the first shade and the translucent reference area comes closest to a shade of grey displayed on the display unit and falling through the area or the opening,
[c] wherein the step [b.1] and the step [b.2] are repeated at least once to output a second shade, for example magenta, of a second of the color values, said second shade being complementary to the color, for example green, of another of the translucent reference areas of the reference card, and to determine and store the identifier of said other of the translucent reference areas,
[d] wherein the identifiers of the reference areas determined in the preceding steps [b.1], [b.2], [c] and stored on the server and/or on the computer are input in this order into a color correction program started on the server and/or on the computer, and
[e] wherein for each image file sent by the server the color correction program is used to adjust the virtual color image for each color value included in the image file by applying the identifiers used as correction values whereby said virtual color image is displayed in colors optimized in respect of its recording conditions.

This object is further achieved by an embodiment according to the invention wherein the step [b.1] and the step [b.2] are repeated at least once more to output a third shade, for example yellow, of a third of the color values, said third shade being complementary to the color, for example blue, of yet another of the translucent reference areas of the reference card, and to determine and store the identifier of said yet other of the translucent reference areas.

This object is further achieved by an embodiment according to the invention wherein the reference card comprises as many differently colored translucent reference areas as shades are output from the routine on the server.

This object is further achieved by an embodiment according to the invention wherein the individual color values are given by R[ed]G[reen]B[lue] pixel triplets.

This object is further achieved by an embodiment according to the invention wherein Lambda correction values are calculated and stored as identifier(s).

This object is further achieved by an embodiment according to the invention wherein Lambda correction values are calculated for each R[ed]G[reen]B[lue] color.

This object is further achieved by an embodiment according to the invention wherein the image file is provided in a normed format.

This object is further achieved by an embodiment according to the invention wherein the virtual color image is taken with a camera under normed light and camera conditions.

This object is further achieved by an embodiment according to the invention wherein the virtual color image is taken under the normed light condition D50.

This object is further achieved by an embodiment according to the invention wherein the virtual color image is taken in the standardised color space sRGB.

This object is further achieved by an embodiment according to the invention wherein the server and the computer are connected via the internet.

This object is further achieved by an embodiment according to the invention wherein the computer is a P[ersonal]C[omputer], a notebook, a smartphone, a tablet or any other mobile end device.

This object is further achieved by an embodiment according to the invention wherein the display unit is a screen, a monitor or a display.

This object is further achieved by an embodiment according to the invention wherein the application program is an app[lication] or a browser.

This object is also achieved by a method for color optimization,
- [a] wherein a reference card is held in front of a proximal computer connected to a distal server and comprising a display unit, said computer displaying on its display unit the virtual color image of the server by means of an application program, said distal server displaying a virtual color image in the form of an image file comprising individual color values on its website, which reference card comprises several differently colored translucent reference areas besides a transparent or translucent area or an opening,
- [b.1] wherein the application program then starts a routine on the server and/or on the computer, said routine firstly outputting a first shade, for example cyan, with a first of the color values, said first shade being complementary to the color, for example red, of one of the translucent reference areas of the reference card,
- [b.2] wherein the reference card having that translucent reference area whose color is complementary to the first shade displayed on the display unit is then held in front of said first shade, and an identifier is determined and stored for that of the translucent reference areas for which the shade of grey resulting from color mixture of the first shade and the translucent reference area comes closest to a shade of grey displayed on the display unit and falling through the area or the opening,
- [c] wherein the step [b.1] and the step [b.2] are repeated at least once to output a second shade, for example magenta, of a second of the color values, said second shade being complementary to the color, for example green, of another of the translucent reference areas of the reference card, and to determine and store the identifier of said other of the translucent reference areas,
- [d] wherein the identifiers of the reference areas determined in the preceding steps [b.1], [b.2], [c] and stored on the server and/or on the computer are input in this order into a color correction program started on the server and/or on the computer, and
- [e] wherein for each image file sent by the server the color correction program is used to adjust the virtual color image for each color value included in the image file by applying the identifiers used as correction values whereby said virtual color image is displayed in colors optimized in respect of its recording conditions.

This object is further achieved by an embodiment according to the invention wherein the color values are given by R[ed]G[reen]B[lue] pixel triplets.

This object is further achieved by an embodiment according to the invention wherein the server and the computer are connected via the internet.

This object is further achieved by an embodiment according to the invention wherein the computer is a P[ersonal]C[omputer], a notebook, a smartphone, a tablet or any other mobile end device.

This object is further achieved by an embodiment according to the invention wherein the display unit is a screen, a monitor or a display.

This object is further achieved by an embodiment according to the invention wherein the application program is an app[lication] or a browser.

This object is also achieved by a use of a routine on a server and/or on a computer of the system of the above-mentioned type, said routine firstly outputting a first shade, for example cyan, of one of the color values, said first shade being aligned to a first of the translucent reference areas, and then being repeated at least once to output another shade, for example magenta, of another of the color values, said other shade being aligned to another of the translucent reference areas.

This object is further achieved by an embodiment according to the invention wherein the color values are given by R[ed]G[reen]B[lue] pixel triplets.

This object is further achieved by an embodiment according to the invention wherein a color correction program is provided on the server or on the computer, the identifiers of the translucent reference areas being input in said color correction program, said identifiers being determined and stored on the server or on the computer by means of the reference card, and said color correction program outputting each optimized color value of the image file to the display unit of the computer.

This object is also achieved by a use of a reference card comprising several differently colored translucent reference areas besides a transparent or translucent area or an opening, said area or said opening letting pass a shade of grey displayed on a display unit, and of a color correction program started by an application program on a proximal computer or on a distal server for displaying a virtual color image on the computer, said virtual color image being displayed in colors optimized in respect of its recording conditions.

This object is further achieved by an embodiment according to the invention wherein the color values are given by R[ed]G[reen]B[lue] pixel triplets.

This object is further achieved by an embodiment according to the invention wherein the server and the computer are connected via the internet.

This object is further achieved by an embodiment according to the invention wherein the computer is a P[ersonal]C [omputer], a notebook, a smartphone, a tablet or any other mobile end device.

This object is further achieved by an embodiment according to the invention wherein the shade of grey is displayed on a screen, on a monitor or on a display.

This object is further achieved by an embodiment according to the invention wherein the application program is an app[lication] or a browser.

This object is further achieved by an embodiment according to the invention wherein the components of the system of the above-mentioned type are applied.

BRIEF DESCRIPTION OF THE DRAWINGS

As already discussed hereinbefore, there are various possibilities for embodying and further developing the teaching of the present invention in an advantageous manner. To this end, on the one hand reference is made to the explanations above and to the dependent claims, and on the other hand further embodiments, features and advantages of the present invention are explained in greater detail hereinafter, inter alia based upon the exemplary embodiment illustrated by FIG. 1 showing a reference card held in front of a display unit, said reference card comprising three differently colored translucent reference areas.

DETAILED DESCRIPTION OF THE INVENTION

According to the invention, any display unit D, i.e. any screen or any monitor or any display of a smartphone or of a tablet can be calibrated in an optimized way in terms of colors by means of a reference card K according to FIG. 1. Therefor, a corresponding button, in particular control button or push button, is provided on the website of the online retailer, for example on the distal server;

by pushing said button, a routine is started by an application program, for example by an appa or by a browser, and an fresh window of the browser is opened;

the reference card K contains at least two, preferably three (cf. FIG. 1) or four translucent reference areas T1, T2, T3, in particular color(ed) foils, for example in the colors red, green, blue or in the colors cyan, magenta, yellow, grey; said reference card K is related to, in particular put into reference to, the virtual color image on the monitor D of the proximal computer (cf. FIG. 1);

for example on the distal server, a routine is carried out in which a neutral grey field (identical R[ed] value, G[reen] value and B[lue] value) and behind the reference color foils subsequently different colors complementary to red, green and blue, i.e. cyan, magenta and yellow are shown through the translucent and partially transparent card, for example in the middle, resulting in different grey shades due to color mixing of screen color and reference color foil; thus, the color foils are not backed with screen-white but with the respective complementary color: the red color foil is back-lighted with a cyan provided by the screen (or computer), and the produced mixed color is neutralized to grey; depending on the screen type, said grey comprises a color fault and can be related to, in particular put into reference to, a "neutral" grey (same R[ed]G[reen]B[lue] value) of the display unit D, said "neutral" grey being displayed besides the color foil, namely through the transparent or translucent area or opening G of the reference card K;

for example visually taken or by means of a colorimeter, of a spectral photometer or of a color camera, a matching or comparison by determining an identifier in respect of which grey provided as displayed mixture of the screen color and the foil color comes closest to the neutrally provided screen grey in the middle; this has the advantage that the human eye and the color measuring technology are more sensitive regarding shifts of the grey balance and thus are able to perceive finest grey value variations as color shifts; as a consequence, a color-metrically sensitive and precise system is provided working in any case more precisely than the comparison of two saturated adjoining red, green or blue color fields;

said identifiers are input as correction values into the color correction program and are applied to all image files displayed by the display unit D, for example from the website of the online retailer of the distal server; articles on the website of the online retailer are displayed on the monitor of the proximal computer in an optimized mode in terms of colors; in particular, color variations due to different screens and/or due to screen settings are compensated.

In this context, the number and the type of the reference areas T1, T2, T3 are to be seen only exemplarily in respect of the colors on the used color foil of the card. It is relevant that each reference area T1, T2, T3 is assigned to one shade or color tone. Thus, the shades need not necessarily be the three basic colors red, green and blue.

This may be expedient when mixing the colors of a screen from the basic colors R[ed]G[reen]B[lue]; however, any colors can be used for color adapting as long as they are sufficiently remote from each other in the color space, in particular possibly at distal ends of the color space; for example, a reference card K with color fields or color foils of cyan, magenta and yellow is possible, thus being on the basis of the C[yan]M[agenta]Y[ellow] color model.

In this way, the screen colors may be adapted by means of only two reference areas T1, T2, for example by means of two color foils though in this case without controlling the brightness. In the same way, more than three color foils may be used to optimize the screen colors, resulting in an improved preciseness and/or in a validation of the first calibration steps.

The reference color displayed in the middle of the card and provided by the screen need not necessarily be a neutral grey (identical R[ed]G[reen]B[lue] value) but it can be provided any RGB variation simulated by mixing the reference color foils and the complementary colors produced on the screen.

In order to enhance the accuracy, the described method may be performed with several RGB color combinations subsequently.

Independently thereof or in combination therewith, it is possible that a user does not hold the color foils not immediately at the monitor but in front of her or his eye, or that the user puts on the color foils in the form of glasses (comparable to 3D glasses with red and green color foil).

A color measuring device or a camera, for example of a smartphone, may be used to evaluate all color fields.

LIST OF REFERENCE SIGNS

D display unit, in particular screen or monitor or display
G opening or transparent or translucent area K reference card
T1 first translucent reference area
T2 second translucent reference area
T3 third translucent reference area

The invention claimed is:

1. A system
with a distal server displaying a virtual color image in the form of an image file comprising individual color values on its website, and
with a proximal computer connected to the server and comprising a display unit, said computer displaying on its display unit the virtual color image of the server by means of an application program,
[a] wherein a reference card is held in front of the computer, said reference card comprising several differently colored translucent reference areas besides a transparent or translucent area or an opening,
[b.1] wherein the application program then starts a routine on the server or on the computer, said routine firstly outputting a first shade, for example cyan, with a first of the color values, said first shade being complementary to the color, for example red, of one of the translucent reference areas of the reference card,
[b.2] wherein the reference card having that translucent reference area whose color is complementary to the first shade displayed on the display unit is then held in front of said first shade, and an identifier is determined and stored for that of the translucent reference areas for which the shade of grey resulting from color mixture of the first shade and the translucent reference area comes closest to a shade of grey displayed on the display unit and being viewable or shown through the transparent or translucent area or the opening,
[c] wherein the step [b.1] and the step [b.2] are repeated at least once to output a second shade, for example magenta, of a second of the color values, said second shade being complementary to the color, for example green, of another of the translucent reference areas of the reference card, and to determine and store the identifier of said other of the translucent reference areas,
[d] wherein the identifiers of the reference areas determined in the preceding steps [b.1], [b.2], [c] and stored on the server or on the computer are input in this order into a color correction program started on the server or on the computer, and
[e] wherein for each image file sent from the server to the computer the color correction program is used to adjust the virtual color image for each color value included in the image file by applying the identifiers used as correction values whereby said virtual color image is displayed in colors optimized in respect of its recording conditions.

2. The system according to claim 1 wherein the step [b.1] and the step [b.2] are repeated at least once more to output a third shade, for example yellow, of a third of the color values, said third shade being complementary to the color, for example blue, of yet another of the translucent reference areas of the reference card, and to determine and store the identifier of said yet other of the translucent reference areas.

3. The system according to claim 1 wherein the reference card comprises as many differently colored translucent reference areas as shades are output from the routine on the server.

4. The system according to claim 1 wherein the color values are given by R[ed]G[reen]B[lue] pixel triplets.

5. The system according to claim 1 wherein the image file is provided in a normed format.

6. The system according to claim 1 wherein the virtual color image is taken with a camera under normed light and camera conditions.

7. The system according to claim 6 wherein the virtual color image is taken under the normed light condition D50.

8. The system according to claim 6 wherein the virtual color image is taken in the standardised color space sRGB.

9. The system according to claim 1 wherein the server and the computer are connected via the internet.

10. The system according to claim 1 wherein the computer is a P[ersonal]C[omputer], a notebook, a smartphone, a tablet or any other mobile end device.

11. The system according to claim 1 wherein the display unit is a screen, a monitor or a display.

12. The system according to claim 1 wherein the application program is an app[lication] or a browser.

13. A method for color optimization,
[a] wherein a reference card is held in front of a proximal computer connected to a distal server and comprising a display unit, said computer displaying on its display unit the virtual color image of the server by means of an application program, said distal server displaying a virtual color image in the form of an image file comprising individual color values on its website, which reference card comprises several differently colored translucent reference areas besides a transparent or translucent area or an opening,
[b.1] wherein the application program then starts a routine on the server or on the computer, said routine firstly outputting a first shade, for example cyan, with a first of the color values, said first shade being complementary to the color, for example red, of one of the translucent reference areas of the reference card,
[b.2] wherein the reference card having that translucent reference area whose color is complementary to the first shade displayed on the display unit is then held in front of said first shade, and an identifier is determined and stored for that of the translucent reference areas for which the shade of grey resulting from color mixture of the first shade and the translucent reference area comes closest to a shade of grey displayed on the display unit being viewable or shown through the transparent or translucent area or the opening,
[c] wherein the step [b.1] and the step [b.2] are repeated at least once to output a second shade, for example magenta, of a second of the color values, said second shade being complementary to the color, for example green, of another of the translucent reference areas of the reference card, and to determine and store the identifier of said other of the translucent reference areas,
[d] wherein the identifiers of the reference areas determined in the preceding steps [b.1], [b.2], [c] and stored on the server or on the computer are input in this order into a color correction program started on the server or on the computer, and
[e] wherein for each image file sent from the server to the computer the color correction program is used to adjust the virtual color image for each color value included in the image file by applying the identifiers used as correction values whereby said virtual color image is displayed in colors optimized in respect of its recording conditions.

14. The method according to claim 13 wherein the color values are given by R[ed]G[reen]B[lue] pixel triplets.

\* \* \* \* \*